United States Patent
Tansey

(10) Patent No.: US 7,126,695 B2
(45) Date of Patent: Oct. 24, 2006

(54) HETERODYNE FREQUENCY MODULATED SIGNAL DEMODULATOR AND METHOD OF OPERATING THE SAME

(75) Inventor: Richard J. Tansey, Camarillo, CA (US)

(73) Assignee: The Boeing Company, Chicago, IL (US)

( * ) Notice: Subject to any disclaimer, the term of this patent is extended or adjusted under 35 U.S.C. 154(b) by 410 days.

(21) Appl. No.: 10/683,615

(22) Filed: Oct. 10, 2003

(65) Prior Publication Data
US 2005/0078295 A1    Apr. 14, 2005

(51) Int. Cl.
G01B 9/02 (2006.01)
G01C 3/08 (2006.01)

(52) U.S. Cl. .................. 356/486; 356/487; 356/4.1

(58) Field of Classification Search ............. 356/486, 356/487, 4.1, 4.09
See application file for complete search history.

(56) References Cited

U.S. PATENT DOCUMENTS

| | | | |
|---|---|---|---|
| 4,575,247 A | 3/1986 | Tansey | |
| 4,707,135 A | 11/1987 | Swain et al. | |
| 5,050,993 A | 9/1991 | Tansey | |
| 5,412,474 A | 5/1995 | Reasenberg et al. | |
| 5,488,230 A | 1/1996 | Mizutani et al. | |
| 5,579,109 A | 11/1996 | Suh et al. | |
| 5,754,293 A | 5/1998 | Farhadiroushan | |
| 6,243,168 B1 * | 6/2001 | Heflinger et al. | 356/486 |
| 6,483,593 B1 | 11/2002 | Bell et al. | |

OTHER PUBLICATIONS

R.J. Tansey, S. Holly; *Acquisition, Tracking and Pointing II—Development of an Interferometric Encoder for High Resolution Angular Measurements*; Reprinted from the *Proceedings of SPIE—The International Society for Optical Engineering*; Jan. 1988; pp. 78-87; vol. 887; Society of Photo-Optical Instrumentation Engineers; Bellingham, Washington USA.

R.J. Tansey, K. Widen; *Current Developments in Optical Engineering III—"Nanosensor" Based on Diffraction*; Reprinted from the *Proceedings of SPIE—The International Society for Optical Engineering*; Aug. 1988; pp. 2-6; vol. 965; Society of Photo-Optical Instrumentation Engineers; Bellingham, Washington USA.

(Continued)

Primary Examiner—Gregory J. Toatley, Jr.
Assistant Examiner—Marissa J Detschel
(74) Attorney, Agent, or Firm—Alston & Bird LLP

(57) ABSTRACT

A heterodyne interferometer, adaptive optics system, method of measuring movement of a target and/or variations in a beam propagation medium, and method of controlling an adaptive optics system are provided. The heterodyne interferometer includes an acoustic-optical modulator that can superimpose a RF signal on a source signal, and output a zero order beam and a higher order beam. One of the beams comprises a target beam and the other beam comprises a local oscillator beam. A telescope can receive the target beam, and direct the target beam through the beam propagation medium to the target. A beam splitter can receive the local oscillator beam and the reflected beam from the target, and coherently combine the local oscillator beam and the reflected beam to produce a fringe pattern. A detector can receive the fringe pattern and generate an electrical beat signal, which can be demodulated based upon the RF signal.

17 Claims, 3 Drawing Sheets

OTHER PUBLICATIONS

D.M. Swain, R.J. Tansey; *Heterodyne holographic interferometry*; Reprinted from SPIE *High Speed Photography, Videography and Photonics III*; 1985; pp. 87-93; vol. 569; Society of Photo-Optical Instrumentation Engineers; Bellingham, Washington USA.

R.J. Tansey; *An Absolute Distance Interferometer using a dye laser Heterodyne Interferometer and spatial separation of beams*; 1983; pp. 43-54; vol. 429; SPIE.

Joseph A. Shaw; *SC567—Introduction to Optical Remote Sensing Systems—Doppler Lidar*; Aug. 2003; 2 pages.

*Adaptive Optics Tutorial*; AdoptiveOptics.com; 5 pages; Available at <http://www.aoainc.com/technologies/adaptiveandmicrooptics/aostutorial.html> (visited Jul. 17, 2003).

\* cited by examiner

HETERODYNE FREQUENCY MODULATED SIGNAL DEMODULATOR AND METHOD OF OPERATING THE SAME

FIELD OF THE INVENTION

The present invention relates generally to methods and apparatus for determining the displacement or location of a target and, more particularly, to a demodulator for heterodyne frequency modulated signals and methods of operating the same.

BACKGROUND OF THE INVENTION

Heterodyne interferometers are utilized in a variety of commercial and noncommercial applications, such as to measure displacement, force, pressure or other physical quantities that create a measurable displacement in a respective transducer. For example, heterodyne interferometers may be utilized in an adaptive optics system to measure movement of a target and/or variations in a medium of beam propagation, such as may be due to atmospheric turbulence. By measuring movement and/or variations in the beam propagation medium, then, the adaptive optics system can correct for such movement and/or variations to accurately image the target.

Heterodyne interferometers include a stable optical source, such as a laser, for providing coherent optical signals. The optical source can provide signals directly to the system or the optical source can be remotely located and connected to the system via optical fibers. Regardless of the location of the optical source, conventional heterodyne interferometers require coherent signals having two different frequencies. In addition, most conventional heterodyne interferometers require that the signals having the first frequency be orthogonally polarized relative to the signals having the second frequency. These heterodyne interferometers are therefore classified as polarizing interferometers. For example, the Hewlett Packard 10715 differential interferometer is a type of polarizing heterodyne interferometer as described in an article by C. Steinmetz, et al., entitled Accuracy Analysis and Improvements to the Hewlett-Packard Laser Interferometer System, SPIE 816, Interferometric Metrology, p. 79 (1987). Similarly, the Hewlett Packard 5527 Laser Position Transducer System is another type of polarizing heterodyne interferometer as described in HP product brochure No. 5964-6190 E entitled Optics and Laser Heads for Laser-Interferometer Positioning Systems (1995).

More specifically, conventional polarizing interferometers include a first laser source for providing a first beam having a first frequency and a first linear polarization and a second laser source having a second frequency and a second linear polarization that is orthogonal to the first polarization state. A polarizing interferometer also includes reference and measurement arms as well as a polarizing beam splitter for separating the first and second beams based upon their polarization such that one of the beams is directed to the measurement arm of the interferometer, while the other beam is directed to the reference arm of the interferometer. Upon returning from the measurement and reference arms, the first and second beams are mixed by a polarization analyzer or other polarization manipulating optical elements so as to create an interference pattern. While the reference arm typically has a fixed or predetermined length, the measurement arm has a length that is defined by the position of a target. As such, as the target is displaced, the optical path length of the measurement arm is accordingly altered. By measuring the phase of the resulting fringes created by the interference of the first and second beams, however, the heterodyne interferometer permits the displacement of the target to be determined.

Nonpolarizing heterodyne interferometers have also been developed. By avoiding the mixing of beams of different polarization states, nonpolarizing interferometers reduce or eliminate the nonlinear errors in the final phase measurement that otherwise arise as a result of polarization crosstalk. See, for example, M. Tanaka et al. "Linear Interpolation of Periodic Error in a Heterodyne Laser Interferometer at Subnanometer Levels," IEEE Trans. Instrum. Meas., vol. 38, No. 2, pp. 552–54 (April 1989); Jack A. Stone et al., "Wavelength Shift Interferometry: Using a Dither to Improve Accuracy," Proc. of the Eleventh Annual Meeting of the American Society for Precision Engineering," pp. 357–62 (Nov. 9–14, 1996); and Chien-ming Wu et al., "Heterodyne Interferometer with Subatomic Periodic Nonlinearity," Applied Optics, Vol. 38, pp. 4089–94 (1999).

Whereas conventional heterodyne interferometers are adequate in measuring displacement due to movement of a target and/or atmospheric turbulence, such interferometers have drawbacks. Among the drawbacks, conventional heterodyne interferometers are often complex systems that can be expensive to produce. In this regard, conventional phase measuring heterodyne interferometers typically require elements to provide an absolute phase measurement of the resulting fringes created by the interference of the first and second beams, such as by utilizing techniques including fringe counting, zero-crossing phase detecting, and the like. More particularly with respect to adaptive optics applications, conventional lateral shear heterodyne interferometers are typically utilized in wavefront sensors and require ea matrix reconstructor to determine phase, which is required to correct for optical phase differences to the target, which may be represented by the phase measurement of the resulting fringes. Further, many conventional interferometers require an undesirable number of detectors to receive the beam from the measurement arm of the interferometer due to required signal-to-noise ratios.

SUMMARY OF THE INVENTION

In light of the foregoing background, embodiments of the present invention provide an improved heterodyne interferometer, and an associated adaptive optics system. Embodiments of the present invention also provide an improved method of measuring movement of a target, variations in a beam propagation medium (e.g., as such may be due to atmospheric turbulence) or the like, where variations in the beam propagation medium may be represented by optical path differences between the system and the target. Embodiments of the present invention also provide an improved method controlling an adaptive optics system. Advantageously, the heterodyne interferometer of embodiments of the present invention operates by producing a frequency change using an electrical frequency modulated (FM) signal, where the frequency change is proportional to the phase change in the target leg based upon interference between an optical local oscillator beam and an optical reflected beam from the target. In this regard, the heterodyne interferometer of embodiments of the present invention need not determine an absolute phase measurement of any resulting fringes, such as by utilizing techniques including fringe counting, zero-crossing phase detecting, and the like. Also, by producing the frequency change using the electrical FM signal, the heterodyne interferometer of embodiments of the present invention can be utilized to control an adaptive optics system without requiring a separate wavefront sensor, reconstructor or the like to determine the aberrated wavefront required to correct for optical path differences to the target, which may be represented by the phase measurement of the resulting fringes. Further, by interfering an optical local oscillator beam and an optical reflected beam from the target, the power of the reflected beam can be amplified above the shot noise, thus improving the signal-to-noise ratio.

According to one aspect of the present invention, a heterodyne interferometer is provided. The heterodyne interferometer includes an acoustic-optical modulator (AOM), a telescope, a beam splitter and a detector. The AOM is capable of receiving an optical source signal and an electrical radio frequency (RF) signal, superimposing the RF signal on the source signal, and thereafter outputting a zero order, un-modulated optical beam and a higher order, modulated optical beam. The heterodyne interferometer can also include a signal source capable of providing the source signal, where the source signal has a coherence length at least as long as a round trip distance between the telescope and the target. After outputting the zero order and higher order beams, one of the zero order and higher order beams comprises a target beam and the other beam comprises a local oscillator beam. The telescope can then receive the target beam, and thereafter direct the target beam through a beam propagation medium to a target such that at least a portion of the received beam can reflect off of the target.

After reflecting off of the target, the beam splitter can receive the reflected beam from the target, as well as the local oscillator beam. Then, the beam splitter can coherently combine the local oscillator beam and the reflected beam to produce a fringe pattern. Advantageously, the beam splitter is capable of coherently combining the local oscillator beam and the reflected beam such that the detector is capable of having a minimum detectable power above a power of the reflected beam. The detector can detect the fringe pattern to thereby generate an electrical beat signal such that the beat signal can be subsequently demodulated based upon the RF signal to thereby determine an electrical signal proportional to a phase difference between the reflected beam and the local oscillator beam. In this regard, the phase difference provides a measure of variances in the beam propagation medium, which may be represented by optical path differences between the beam splitter and the target.

The heterodyne interferometer can be formed in any of a number of different constructions, including a bi-static construction and a transceiver construction. More particular to the bi-static construction, then, the telescope can comprise a transmitting telescope. The heterodyne interferometer in the bi-static construction can also include a receiving telescope capable of receiving the reflected beam and thereafter directing the reflected beam to the detector.

In a transceiver construction, the heterodyne interferometer can further include a half-wave plate, a polarizing beam splitter and a quarter-wave plate. The half-wave plate is capable of receiving the target beam from the AOM and rotating the plane of polarization of the target beam. The polarizing beam splitter can then receive the target beam from the half-wave plate, and thereafter divide the target beam into a horizontally-polarized target beam and a vertically-polarized target beam. In turn, the quarter-wave plate can receive the vertically-polarized target beam, circularly-polarize the target beam, and thereafter pass the circularly-polarized target beam to the telescope. Also in the transceiver construction, the quarter-wave plate can also be capable of receiving the reflected beam and circularly polarizing the reflected beam such that the reflected beam has a ninety degree phase shift compared to the polarization of the beam passed to the telescope to thereby produce a horizontally-polarized reflected beam. And the polarizing beam splitter can also be capable of receiving the horizontally-polarized reflected beam from the quarter-wave plate, and thereafter reflecting the horizontally-polarized reflected beam to the detector.

According to another aspect of the present invention, an adaptive optics system is provided. The adaptive optics system includes an adaptive optics assembly and a heterodyne interferometer. The adaptive optics assembly includes a deformable mirror that has at least one actuator capable of driving a shape of the deformable mirror. More particularly, the actuators can be capable of driving the shape of the deformable mirror based upon movement of the target and/or variances in a beam propagation medium, where the variances in the beam propagation medium may be represented by optical path differences between the system and the target. The heterodyne interferometer can comprise a heterodyne interferometer as such is described above. In this regard, the heterodyne interferometer is capable of providing at least one electrical signal to the adaptive optics assembly to thereby drive the shape of the deformable mirror.

According to further aspects of the present invention, an improved method of measuring movement of a target, variations in a beam propagation medium (e.g., as such may be due to atmospheric turbulence) or the like, and method of controlling an adaptive optics system are provided.

BRIEF DESCRIPTION OF THE DRAWINGS

Figure 1:
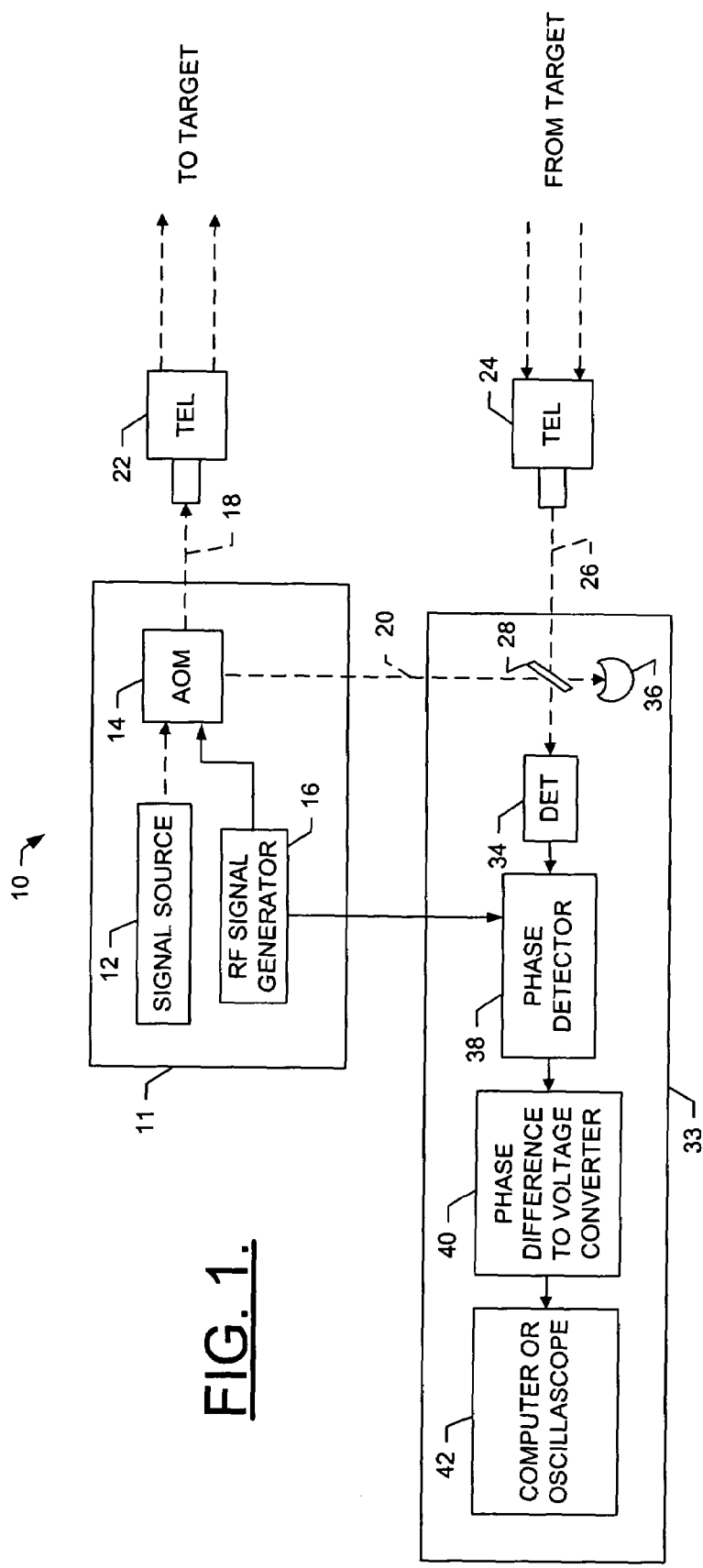
Figure 2:
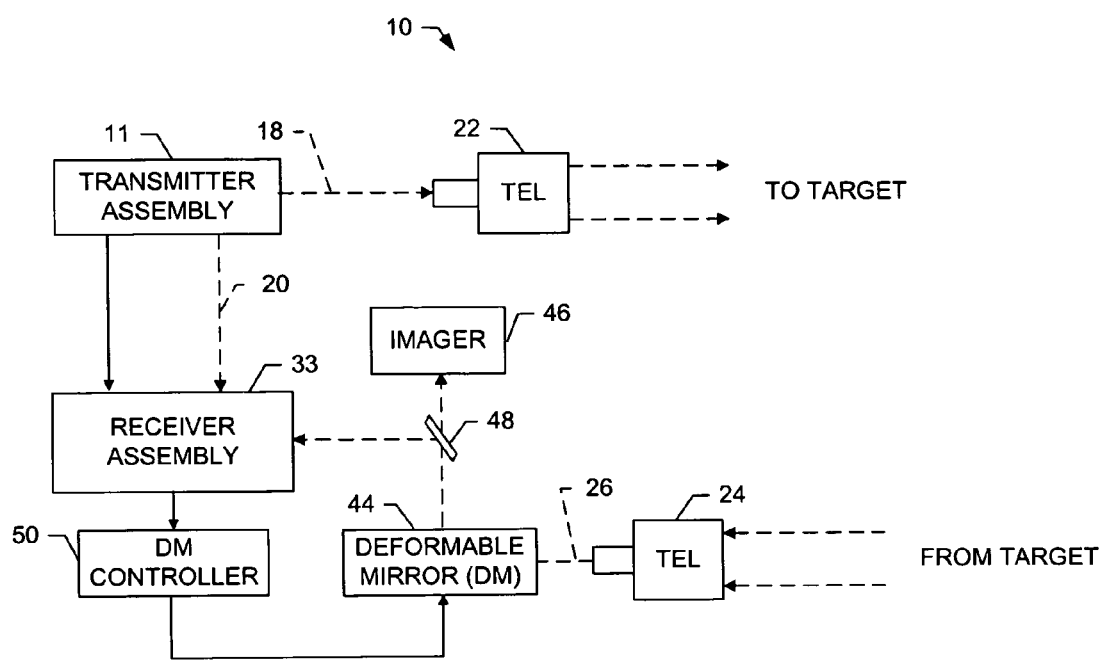
Figure 3:
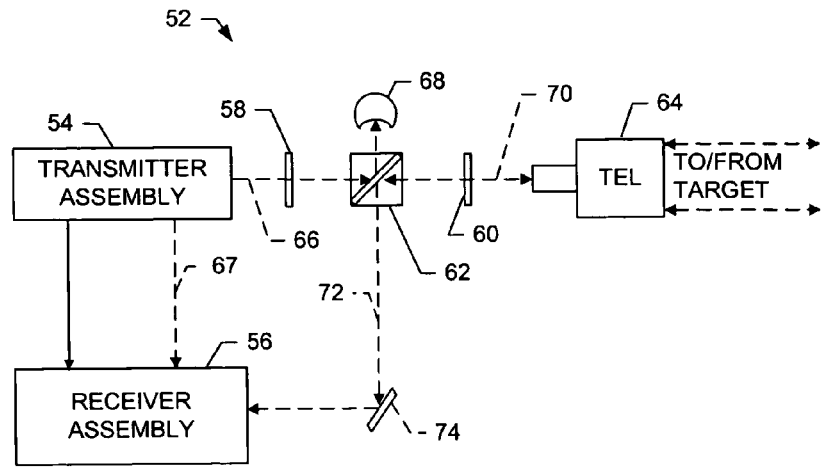
Figure 4:
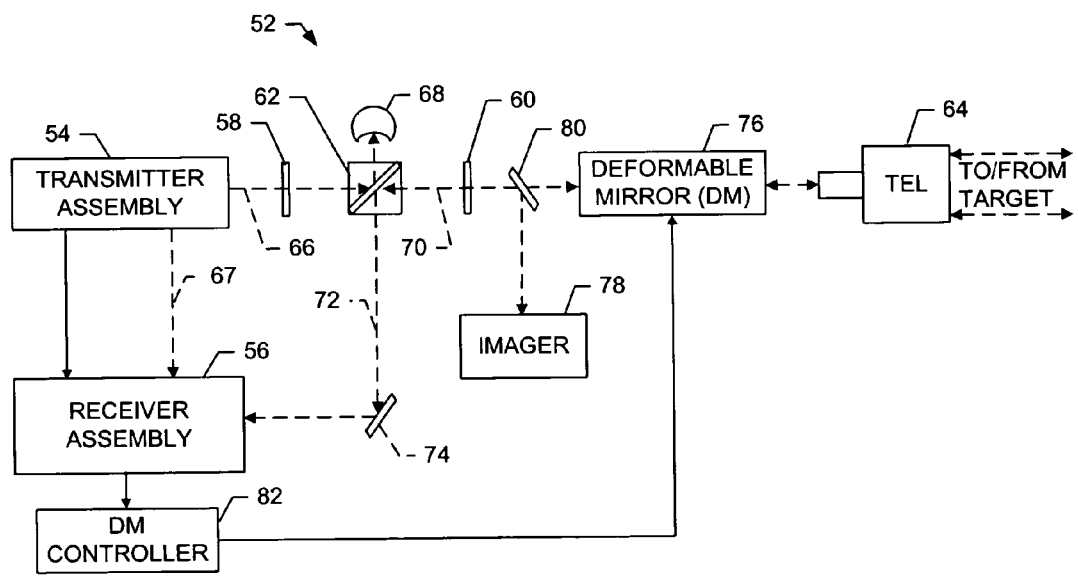

Having thus described the invention in general terms, reference will now be made to the accompanying drawings, which are not necessarily drawn to scale, and wherein:

FIG. 1 is a schematic block diagram of a heterodyne interferometer according to one embodiment of the present invention in a bi-static construction;

FIG. 2 is a schematic block diagram of an adaptive optics system including a heterodyne interferometer in a bi-static construction, according to one embodiment of the present invention;

FIG. 3 is a schematic block diagram of a heterodyne interferometer according to another embodiment of the present invention in a transceiver construction; and FIG. 4 is a schematic block diagram of an adaptive optics system including a heterodyne interferometer in a transceiver construction, according to another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIGS. 1 and 2, a heterodyne interferometer system 10 according to one embodiment of the present invention is shown where the system has a bi-static construction. The system according to various embodiments will be shown and described as including a number of optical and electrical components operating in a manner as described herein to obtain a measurement of the movement, or vibration, of a target and/or variances in a beam propagation medium (e.g., atmosphere) between the system and the target, where the variances in the beam propagation medium may be represented by optical path differences between the system and the target. As will be appreciated by those skilled in the art, however, the system can also include any of a number of additional optical and/or electrical components, not shown or described herein, that may facilitate operation of one or more of the optical and/or electrical components described herein. For example, the system may also include one or more mirrors and/or beam splitters capable of directing optical signals to one or more of the optical elements described herein. Also, for example, the system may also include one or more signal processing elements capable of processing electrical signals into a format capable of being received by one or more of the electrical components shown and described herein.

As shown, the system 10 includes a transmitter assembly 11 and a receiver assembly 33, as well as a transmitting telescope 22 and a receiving telescope 24. The transmitter assembly includes a signal source 12, such as a laser source, for providing a signal beam, such as a laser beam. The signal beam typically comprises a single frequency beam that has a coherence length at least as long as the round trip path length between a transmitting telescope 22 and a target (not shown). In this regard, the coherence length of the signal beam can typically be defined as a distance by which a portion of the signal beam can be delayed relative to the remainder of the beam and still be capable of interfering with itself.

In other terms, the coherence length can be defined based upon a linewidth of the signal beam, where the linewidth represents a broadening of the signal beam transition, which results in a decreased coherence length. Notationally, the coherence length L can be expressed as L=c/lw, where c represents the speed of light (approximately $3\times10^8$ m/s), and lw represents the linewidth of the signal beam in Hz. Written in terms of the linewidth of the signal beam, then, in the above embodiment, a signal beam with a linewidth of 1 kHz has a coherence length of approximately 300 km (i.e., L=$(3\times10^8)$/1000). In this embodiment, the system 10 may be capable of measuring optical path differences between the system and a target at a position of the target at a distance of up to 150 km (i.e., 300/2 km) from the transmitting telescope 22.

In addition to the signal source 12, the transmitter assembly 11 of the system 10 also includes an acousto-optic modulator (AOM) assembly 14, which may comprise one or more AOMs. The AOM assembly can receive the signal beam from the signal source. Additionally, the transmitter assembly may include a radio frequency (RF) signal generator 16 capable of providing a radio frequency (RF) signal to the AOM assembly, where the RF signal creates an acoustic standing wave in the AOM, which will be appreciated by those skilled in the art. Then, with the signal beam from the signal source and the RF signal, the AOM assembly can superimpose the RF signal on the signal beam via this acoustic grating, or sanding wave, to thereby generate one or more output beams. More particularly, as shown, the AOM assembly can generate an output zero order beam 18 and an output N order beam, such as a first order beam 20. In one embodiment, for example, the AOM assembly can generate an output, unmodulated zero order beam, and a first order beam modulated by a frequency of 40 MHz from the RF source. Although the N order beam may be described herein as a first order beam, it should be appreciated that the N order beam may have any of N orders without departing from the spirit and scope of the present invention.

From the AOM assembly 14, one of the output beams can function as a target beam and the other output beam can function as a local oscillator beam. In this regard, the target beam can progress from the AOM assembly to the transmitting telescope 22, which directs the target beam toward the target. Similarly, the local oscillator beam can pass from the AOM assembly to the receiver assembly 33, or more particularly a beam splitter 28 within the receiver assembly. As described herein, the target beam comprises the zero order beam 18, and the local oscillator beam comprises the first order beam 20. As will be appreciated by those skilled in the art, however, the first order beam can function as the target beam, with the zero order beam functioning as the local oscillator beam, without departing from the spirit and scope of the present invention.

Upon reaching the target, at least a portion of the target beam can be reflected toward a receiving telescope 24. The receiving telescope can receive the reflected beam 26, and can thereafter pass the reflected beam to the beam splitter 28. Within the beam splitter, the reflected beam and the local oscillator beam 20 coherently combine, or interfere, to produce a fringe pattern. Thereafter, the fringe pattern can be detected with a detector 34, with any remaining portion of the local oscillator beam being supplied to some type of beam dump 36. The detector can comprise any of a number of detectors capable of detecting the fringe pattern, but in one embodiment, the detector comprises a square law type detector, such as a photo detector.

Advantageously, because the beam splitter 28 combines the reflected beam 26 and the local oscillator beam 20, the detector 34 can have a minimum detectable power above the power of the reflected beam. For example, the reflected beam can have a power measuring $1\times10^{-15}$ Watts (i.e., 1 femto-Watt), while the detector has a minimum detectable power of $1\times10^{-9}$ Watts (i.e., 1 nano-Watt). More particularly, the local oscillator beam may have a power in the milli-Watt range, while the reflected beam may have power in the pico-Watt, or even femto-Watt, range. Then, when the beam splitter combines the two beams, the power of the local oscillator beam amplifies the power of the reflected beam to thereby cause the detector to be driven far above the Shott noise level (i.e., level of Poisson noise due to photons). By combining the reflected beam and the local oscillator beam, then, the signal-to-noise (SNR) ratio at the detector can be improved by the square root of the product of the local oscillator beam power and the reflected beam power.

The output of the detector 34 comprises an electrical beat signal representative of the beam combination of the reflected beam 26 and the local oscillator beam 20. As will be appreciated, the beat signal has a beat frequency equal to the difference frequency between the reflected beam and the local oscillator beam, and has a phase equal to the optical differential phase shift between the reflected beam and the local oscillator beam. As will also be appreciated, the beat frequency is typically the result of a Doppler shift in frequency when the target moves relative to the system 10. Additionally, or alternatively, the beat frequency can be the result of variances in the beam propagation medium (e.g., variances in the atmosphere) between the system and the target, where the variances in the beam propagation medium may be represented by optical path differences between the system and the target. For example, as is well known to those skilled in the art, when the target signal 18 is transmitted through free space over particularly large distances, atmospheric turbulence can cause fluctuations in the amplitude and/or phase of the reflected signal 26 received by the receiving telescope 24.

Following the detector, the receiver assembly 33 can continue to process the beat signal. In this regard, the beat signal can be received by a phase detector 38, which can also receive the RF signal from the RF signal generator 16. Then, the phase detector can demodulate the beat signal based upon the RF signal. Thereafter, the phase detector can process the demodulated beat signal into an output signal proportional to the phase difference between the reflected beam 26 and the local oscillator beam 20, where the phase difference provides a measure of the movement or vibration of the target, and/or variances in the beam propagation medium (e.g., atmospheric turbulence), where the variances in the beam propagation medium may be represented by optical path differences between the system and the target.

As will be appreciated, the output signal from the phase detector 38, which is a measure of the movement, or vibration, of the target and/or variances in the beam propagation medium, can be utilized in any of a number of different manners. In one embodiment, for example, the receiver assembly 33 can include a phase difference to voltage converter 40, and a computer and/or voltage measuring device such as an oscilloscope 42. In such an instance, the output signal from the phase detector can be converted to a voltage by the phase difference to voltage converter. Then, the voltage can be stored in a computer and/or viewed on the voltage measuring device. Additionally, or alternatively, the voltage can be used to drive an adaptive optics assembly.

As shown in FIG. 2, such an adaptive optics assembly can include a deformable mirror 44 located between the receiving telescope 24 and the beam splitter 28, where the deformable mirror is capable of reflecting the reflected beam 26 from the receiving telescope toward the beam splitter. The adaptive optics assembly can also include an imager 46, such as an imaging charge-coupled device (CCD). The image is capable of receiving the reflected beam from the deformable mirror, and thereafter imaging the target based upon the reflected beam. To divide the reflected beam such that the beam splitter 28 and the imager 46 each receive at least a portion of the reflected beam, a beam splitter 48 may be placed between the deformable mirror and the imager and beam splitter 28.

As will be appreciated by those skilled in the art, the deformable mirror includes an array of one or more actuators capable of driving the shape of the deformable mirror, as such is well known to those skilled in the art. In this regard, the receiver assembly 33 of the system 10 can include a detector 34 for each actuator of the deformable mirror. In operation then, the output of the phase detector 38 for each detector 34 can be utilized to drive the respective actuators of the deformable mirror. Advantageously, by utilizing the output of the phase detectors for the detectors, the adaptive optics assembly need not include a wavefront reconstructor, at least one of which is required by conventional adaptive optics assemblies.

During operation, then, the outputs of the phase detector 38 for each detector 34 can be received, either directly or indirectly (e.g., via the phase difference to voltage converter 40), by a deformable mirror controller 50. In turn, the deformable mirror controller can process the outputs of the phase detector, and provide drive signals to the actuators of the deformable mirror based upon the outputs of the phase detector. For example, the deformable mirror controller can provide drive signals to the actuators of the deformable mirror such that the outputs of the detectors during continuous operation of the system including the adaptive optics assembly are driven to zero, representing a null phase difference between the reflected beam 26 and the local oscillator beam 20. In this manner, the actuators of the deformable mirror can shape the deformable mirror to offset movement of the target and/or variances in the beam propagation medium. By offsetting movement of the target and/or variances in the beam propagation medium, the imager 46 can accurately image the target.

Reference is now made to FIG. 3, which illustrates a heterodyne interferometer system 52 according to another embodiment of the present invention, where the system has a transceiver construction. The system 52 illustrated in FIG. 3 is similar to the system 10 illustrated in FIG. 1 in that it also includes a transmitter assembly 54 and a receiver assembly 56, which may include the same elements, and operate in the same manner, as the transmitter assembly 11 and receiver assembly 33, respectively. In contrast to the system illustrated in FIG. 1, however, the system 56 of FIG. 3 also includes a pair of waveplates 58, 60 and a polarizing beam splitter 62. In addition, the system 56 includes a single telescope 64 capable of directing the target beam toward the target, and receiving the reflected beam from the target.

In a manner similar to before, operation of the system 52 shown in FIG. 3 begins with the transmitter assembly 54 providing a target beam 66 to the telescope 64, and providing a local oscillator beam 67 to the receiver assembly 56. Before the target beam reaches the telescope, however, the target beam is first divided by the polarizing beam splitter 62 into two orthogonally-polarized target beams—a vertically-polarized target beam and a horizontally-polarized target beam. The intensity ratio between the orthogonally polarized beams can be controlled by a half-wave plate 58 that can rotate the plane of polarization of the target beam 56 entering the polarizing beam splitter. One of the polarized target beams (e.g., the horizontally-polarized target beam), can be reflected from the beam splitter and supplied to some type of beam dump 68, and the other polarized target beam (e.g., the vertically-polarized target beam) can be transmitted through the polarizing beam splitter.

After being transmitted through the polarizing beam splitter 62, the vertically-polarized target beam 70, for example, can pass through a quarter-wave plate 60 so as to be circularly polarized. The circularly polarized target beam can then be provided to the telescope 64, and from the telescope to the target. In a manner similar to before, upon reaching the target, at least a portion of the target beam is reflected back toward the telescope. Upon reflection, the reflected beam 72 is converted to an orthogonal polarization from the previous state of the reflected beam. After being received by the telescope, the reflected beam can again pass through the quarter-wave plate, which provides for efficient transmission of the reflected beam to the receiver assembly 56, such as via a mirror 74. In this regard, when the reflected beam passes through the quarter-wave plate a second time, the plane of polarization is rotated ninety degrees compared to the circularly polarized beam sent to the target from the telescope. Therefore, the reflected beam can be reflected by the polarizing beam splitter as a horizontally-polarized reflected beam.

Upon reception of the non-polarized reflected beam 72, the receiver assembly 56 can coherently combine the reflected beam and the local oscillator beam 67 to produce a fringe pattern, such as by utilizing a beam splitter as described above. Then, the fringe pattern can be detected to thereby generate an electrical beat signal having a beat frequency equal to the optical path difference between the reflected beam and the local oscillator beam, and a phase equal to the optical differential phase shift between the reflected beam and the local oscillator beam, as such are described above. As also described above, the beat frequency can be the result of a Doppler shift in frequency when the target moves relative to the system 52, and/or the result of variances in the beam propagation medium.

As before, the receiver assembly 56 can continue to process the beat signal. For example, the receiver assembly can receive an RF signal from the transmitter assembly 54 (i.e., the RF signal driving an AOM in the transmitter assembly), and demodulate the beat signal based upon the RF signal, such as by utilizing a phase detector as described above. Then, as also described above, the phase detector can process the demodulated beat signal into an output signal proportional to the phase difference between the reflected beam 72 and the local oscillator beam 67, where the phase difference provides a measure of the movement, or vibration, of the target and/or variances in the beam propagation medium (e.g., atmospheric turbulence), where the variances in the beam propagation medium may be represented by optical path differences between the system and the target.

As will be appreciated, and again as described above, the output signal from the phase detector, which is a measure of the movement, or vibration, of the target and/or variances in the beam propagation medium, can be utilized in any of a number of different manners. For example, the receiver assembly 56 can include a phase difference to voltage converter, and a computer and/or voltage measuring device such as an oscilloscope, both of which may operate in a manner as described above with respect to receiver assembly 33. Additionally, or alternatively, like with the system of FIG. 1, the system 52 of FIG. 3 can be utilized to provide the voltage to drive an adaptive optics assembly.

As shown in FIG. 4, such an adaptive optics assembly can include a deformable mirror 76 located between the telescope 64 and the quarter-wave plate 60, where the deformable mirror is capable of reflecting the reflected beam 72 from the receiving telescope toward the quarter-wave plate. The adaptive optics assembly can also include an imager 78, such as an imaging CCD, which may operate in a manner similar to that described above with respect to FIG. 2. To divide the reflected beam such that the quarter-wave plate and the imager each receive at least a portion of the reflected beam, a beam splitter 80 may be placed between the deformable mirror and the imager and quarter-wave plate.

As described above with respect to FIGS. 2 and 4, the deformable mirror includes an array of one or more actuators capable of driving the shape of the deformable mirror, and as such, the receiver assembly 56 can include a detector 34 for each actuator of the deformable mirror. It should be understood, however, that the receiver assembly can include more than one detector for each actuator, or alternatively, can include one detector for more than one actuator. In operation, the outputs of the phase detector 38 for the detectors, which are measures of the movement of the target and/or variances in the beam propagation medium (represented, for example, by optical path differences between the system and the target), can be utilized to drive the actuators of the deformable mirror. In this regard, the adaptive optics assembly need not include a wavefront reconstructor. During operation, then, the deformable mirror controller 82 can receive, either directly or indirectly (e.g., via a phase difference to voltage converter), the outputs of the phase detector, which may be based upon the outputs of one or more detectors.

In turn, the deformable mirror controller 82 can process the outputs of the phase detector 38, and provide drive signals to the actuators of the deformable mirror based upon the outputs of the phase detector. For example, the deformable mirror controller can provide drive signals to the actuators of the deformable mirror such that the outputs of the detectors during continuous operation of the system including the adaptive optics assembly are driven to zero, representing a null phase difference between the reflected beam 72 and the local oscillator beam 67. As such, the system 52 including the adaptive optics assembly can account for movement of the target and/or variations in the medium of beam propagation such that the imager 78 can accurately image the target.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A heterodyne interferometer comprising:
an acoustic-optical modulator (AOM) for receiving an optical source signal and an electrical radio frequency (RF) signal, superimposing the RF signal on the source signal, and thereafter outputting a zero order, unmodulated optical beam and a higher order, modulated optical beam, wherein one of the zero order and higher order beams comprises a target beam and the other beam comprises a local oscillator beam;
a telescope for receiving the target beam, and thereafter directing the target beam through a beam propagation medium to a target such that at least a portion of the target beam reflects off of the target;
a beam splitter for receiving the local oscillator beam and the reflected beam from the target, wherein the beam splitter is also for coherently combining the local oscillator beam and the reflected beam to produce a fringe pattern;
a detector for detecting the fringe pattern to thereby generate an electrical beat signal to permit the beat signal to be subsequently demodulated based upon the RF signal to thereby determine an electrical signal proportional to a phase difference between the reflected beam and the local oscillator beam, wherein the phase difference represent an optical path difference between the beam splitter and the target;
a half-wave plate for receiving the target beam from the AOM and rotating the plane of polarization of the target beam;
a polarizing beam splitter for receiving the target beam from the half-wave plate, and thereafter dividing the target beam into a horizontally-polarized target beam and a vertically-polarized target beam; and
a quarter-wave plate for receiving the vertically-polarized target beam, circularly-polarizing the target beam, and thereafter passing the circularly-polarized target beam to the telescope, wherein the circularly-polarized target beam becomes circularly-polarized in an opposite direction when the target beam reflects off the target, wherein the quarter-wave plate is also for receiving the reflected beam and rotating the plane of polarization of the reflected beam ninety degrees compared to the polarization of the beam passed to the telescope, and wherein the polarizing beam splitter receives the reflected beam from the quarter-wave plate and thereafter reflect the reflected beam to the beam splitter as a non-polarized reflected beam.

2. A heterodyne interferometer according to claim 1, wherein the telescope comprises a transmitting telescope, and wherein the heterodyne interferometer further comprises a receiving telescope for receiving the reflected beam and thereafter directing the reflected beam to the detector.

3. A heterodyne interferometer according to claim 1 further comprising:

a signal source for providing the source signal, wherein the source signal has a coherence length at least as long as a round trip distance between the telescope and the target.

4. A heterodyne interferometer according to claim 1, wherein the has a minimum detectable power above a power of the reflected beam.

5. An adaptive optics system comprising:

an adaptive optics assembly comprising a deformable mirror comprising at least one actuator for driving a shape of the deformable mirror, wherein the at least one actuator is also for driving the shape of the deformable mirror; and a heterodyne interferometer for providing at least one electrical signal to the adaptive optics assembly to thereby drive the shape of the deformable mirror, wherein the heterodyne interferometer comprises:

a transmitter assembly for superimposing an electrical radio frequency (RF) signal on a source signal, and thereafter outputting a zero order, un-modulated optical beam and a higher order, modulated optical beam, wherein one of the zero order and higher order beams comprises a target beam and the other beam comprises a local oscillator beam, and wherein the transmitter assembly is also for passing the target beam to a telescope that is also for the target beam through the beam propagation medium to a target such that at least a portion of the target beam reflects off of the target and the deformable mirror; and a receiver assembly for receiving the local oscillator beam and the reflected beam from the deformable mirror, coherently combining the local oscillator beam and the reflected beam to produce a fringe pattern, wherein the receiver assembly is also for generating an electrical beam signal based upon the fringe pattern, and is also for demodulating the beat signal based upon the RF signal to thereby determine an electrical signal proportional to a phase difference between the reflected beam and the local oscillator beam, wherein the phase difference represents an optical path difference between the heterodyne interferometer and the target.

6. An adaptive optics system according to claim 5, wherein the transmitter assembly comprises:

a signal source for providing the source signal, wherein the source signal has a coherence length at least as long as a round trip distance between the telescope and the target; and an acoustic-optical modulator (AOM) for receiving an optical source signal and the RF signal, superimposing the RF signal on the source signal, and thereafter outputting a zero order, un-modulated optical beam and a higher order, modulated optical beam.

7. An adaptive optics system according to claim 5, wherein the receiver assembly comprises:

a beam splitter for receiving the local oscillator beam and the reflected beam from the deformable mirror, wherein the beam splitter is also for coherently combining the local oscillator beam and the reflected beam to produce a fringe pattern; and at least one detector for detecting the fringe pattern to thereby generate at least one electrical beat signal such that the at least one beat signal is also for subsequently demodulating based upon the RF signals to thereby determine at least one electrical signal proportional to a phase difference between the reflected beam and the local oscillator beam, wherein the phase difference represents an optical path difference between the beam splitter and the target.

8. An adaptive optics system according to claim 7, wherein the detector has a minimum detectable power above a power of the reflected beam.

9. An adaptive optics system according to claim 5, wherein the telescope comprises a transmitting telescope, and wherein the system further comprises a receiving telescope for receiving the reflected beam and thereafter directing the reflected beam to the deformable mirror such that the deformable mirror passes the reflected beam to at least one detector.

10. An adaptive optics system according to claim 5 further comprising:

a half-wave plate for receiving the target beam from the transmitter assembly and rotating the plane of polarization of the target beam;

a polarizing beam splitter for receiving the target beam from the half-wave plate, and thereafter dividing the target beam into a horizontally-polarized target beam and a vertically-polarized target beam; and a quarter-wave plate for receiving the vertically-polarized target beam, circularly-polarizing the target beam, and thereafter passing the circularly-polarized target beam to the telescope, wherein the quarter-wave plate is also for receiving the reflected beam from the deformable mirror and circularly-polarizing the reflected beam such that the reflected beam has a ninety degree phase shift compared to the circularly-polarized target beam to thereby produce a horizontally-polarized reflected beam, and wherein the polarizing beam splitter is also for receiving the horizontally-polarized reflected beam from the quarter-wave plate and thereafter is also for reflecting the horizontally-polarized reflected beam to the detector.

11. A method of measuring at least one of movement of a target and variances in a beam propagation medium, the method comprising:

receiving an optical source signal and an electrical radio frequency (RF) signal, superimposing the RF signal on the source signal, and thereafter outputting a zero order, un-modulated optical beam and a higher order, modulated optical beam, wherein one of the zero order and higher order beams comprises a target beam and the other beam comprises a local oscillator beam;

receiving the target beam at a half-wave plate and rotating the plane of polarization of the target beam;

receiving the target beam from the half-wave plate, and thereafter dividing the target beam into a horizontally-polarized target beam and a vertically-polarized target beam;

receiving the vertically-polarized target beam at a quaffer-wave plate, circularly-polarizing the target beam, and thereafter passing the circularly-polarized target beam to a telescope;

directing the circularly-polarized target beam, via the telescope, through the beam propagation medium to a target such that at least a portion of the target beam reflects off of the target, wherein the circularly-polarized target beam becomes circularly-polarized in an opposite direction when the target beam reflects off the target;

receiving the reflected beam at the quarter-wave plate and rotating the plane of polarization of the reflected beam ninety degrees compared to the polarization of the beam passed to the telescope;

receiving the reflected beam from the quarter-wave plate and thereafter reflecting the reflected beam to a beam splitter as a non-polarized reflected beam;

receiving the local oscillator beam and the non-polarized reflected beam at the beam splitter, and thereafter coherently combining the local oscillator beam and the non-polarized reflected beam to produce a fringe pattern; and detecting the fringe pattern to thereby generate an electrical beat signal such that the beat signal is also for subsequently demodulating based upon the RF signal to thereby determine an electrical signal proportional to a phase difference between the reflected beam and the local oscillator beam, wherein the phase difference provides a measure of an optical path difference between the heterodyne interferometer and the target.

12. A method according to claim 11 further comprising:
providing the source signal, wherein the source signal has a coherence length at least as long as a round trip distance between the telescope and the target.

13. A method according to claim 11, wherein detecting the fringe pattern comprises detecting, via a detector, the fringe pattern, the detector having a minimum detectable power above a power of the reflected beam.

14. A method of controlling an adaptive optics assembly comprising a deformable mirror including at least one actuator for driving the shape of the deformable mirror, the method comprising:

measuring at least one of movement of a target and variances in a beam propagation medium, wherein measuring at least one of movement of a target and variances in a beam propagation medium comprises:

superimposing an electrical radio frequency (BY) signal on a source signal, and thereafter outputting a zero order, un-modulated optical beam and a higher order, modulated optical beam, wherein one of the zero order and higher order beams comprises a target beam and the other beam comprises a local oscillator beam;

directing the target beam, via a heterodyne interferometer, through the beam propagation medium to a target such that at least a portion of the target beam reflects off of the target and the deformable mirror;

receiving the local oscillator beam and the reflected beam from the deformable mirror, and thereafter coherently combining the local oscillator beam and the reflected beam to produce a fringe pattern; and generating an electrical beat signal based upon the fringe pattern, and thereafter demodulating the beat signal based upon the BY signal to thereby determine an electrical signal proportional to a phase difference between the reflected beam and the local oscillator beam, wherein the phase difference provides a measure of an optical path difference between the heterodyne interferometer and the target; and providing at least one electrical signal to the at least one actuator to thereby drive the shape of the deformable mirror.

15. A method according to claim 14, wherein directing the target beam comprises directing, via a telescope of the heterodyne interferometer, the target beam, and wherein measuring at least one of movement of a target and variances in a beam propagation medium further comprises providing the source signal, wherein the source signal has a coherence length at least as long as a round trip distance between the telescope and the target.

16. A method according to claim 14, wherein generating an electrical beat signal comprises detecting the fringe pattern to thereby generate the electrical beat signal.

17. A method according to claim 14, wherein detecting the fringe pattern comprises detecting, via a detector, the fringe pattern, the detector having a minimum detectable power above a power of the reflected beam.

* * * * *

UNITED STATES PATENT AND TRADEMARK OFFICE
CERTIFICATE OF CORRECTION

PATENT NO. : 7,126,695 B2 Page 1 of 1
APPLICATION NO. : 10/683615
DATED : October 24, 2006
INVENTOR(S) : Tansey It is certified that error appears in the above-identified patent and that said Letters Patent is hereby corrected as shown below:

Column 14,
Lines 5 and 22, "BY" should read --RF--.

Signed and Sealed this

Twentieth Day of March, 2007

JON W. DUDAS
*Director of the United States Patent and Trademark Office*